(12) United States Patent
Asakura et al.

(10) Patent No.: US 9,217,468 B2
(45) Date of Patent: Dec. 22, 2015

(54) SLIDING MEMBER

(75) Inventors: Hiroyuki Asakura, Aichi (JP); Mikihito Yasui, Aichi (JP); Shigeya Haneda, Aichi (JP); Satoshi Takayanagi, Aichi (JP); Tatsuo Yamada, Aichi (JP)

(73) Assignee: DAIDO METAL COMPANY LTD., Nagoya-Shi, Aichi-Ken (JP)

(*) Notice: Subject to any disclaimer, the term of this patent is extended or adjusted under 35 U.S.C. 154(b) by 0 days.

(21) Appl. No.: 13/984,963

(22) PCT Filed: Feb. 10, 2012

(86) PCT No.: PCT/JP2012/053125
§ 371 (c)(1),
(2), (4) Date: Aug. 12, 2013

(87) PCT Pub. No.: WO2012/108528
PCT Pub. Date: Aug. 16, 2012

(65) Prior Publication Data
US 2013/0316189 A1    Nov. 28, 2013

(30) Foreign Application Priority Data

Feb. 10, 2011 (JP) ................. 2011-027229

(51) Int. Cl.
*F16C 33/12* (2006.01)
*B32B 15/01* (2006.01)
(Continued)

(52) U.S. Cl.
CPC ............. *F16C 33/125* (2013.01); *B32B 15/013* (2013.01); *B32B 15/015* (2013.01);
(Continued)

(58) Field of Classification Search
CPC ...... C23C 28/00; C23C 28/02; C23C 28/021; C23C 30/00; C23C 30/005; C23C 28/322; B32B 15/013; B32B 15/015; B32B 15/04; B32B 15/043; B32B 2307/704; B32B 2311/08; B32B 2475/00; Y10T 428/12896; Y10T 428/12681; Y10T 428/12743; Y10T 428/12931; Y10T 428/12944; Y10T 428/12951; Y10T 428/12972; Y10T 428/12979; Y10T 428/12937; Y10T 428/12993
USPC .................. 428/642, 673, 678, 679, 680, 687
See application file for complete search history.

(56) References Cited

U.S. PATENT DOCUMENTS 6,575,635 B1    6/2003   Tsuji et al.
2004/0241489 A1  12/2004  Kawachi et al.
(Continued)

FOREIGN PATENT DOCUMENTS

JP    2001-132754 A    5/2001
JP    2004-353042 A    12/2004
(Continued)

OTHER PUBLICATIONS

Machine Translation, Yoshihara et al., JP 2005-232480 A, Sep. 2005.*
(Continued)

*Primary Examiner* — Michael E La Villa
(74) *Attorney, Agent, or Firm* — Browdy and Neimark, PLLC

(57) ABSTRACT

A slide member is provided with a base material and an overlay provided over the base material. The overlay includes a plurality of regions in a thickness direction including a region located in sliding-surface side that slides with the counter element and a region located in a base-material side. A material forming the overlay includes a plurality of crystal planes. Orientation index of at least one of the crystal planes differs in the region located in the sliding-surface side and the region located in the base-material side of the overlay.

4 Claims, 14 Drawing Sheets

(51) Int. Cl.
  *C23C 28/00* (2006.01)
  *C23C 30/00* (2006.01)
  *C23C 28/02* (2006.01)
  *B32B 15/04* (2006.01)
  *C25D 5/10* (2006.01)
  *C25D 7/10* (2006.01)

(52) U.S. Cl.
  CPC .............. *B32B 15/04* (2013.01); *B32B 15/043* (2013.01); *C23C 28/00* (2013.01); *C23C 28/02* (2013.01); *C25D 5/10* (2013.01); *C25D 7/10* (2013.01); *F16C 33/124* (2013.01); *Y10T 428/12681* (2015.01); *Y10T 428/12743* (2015.01); *Y10T 428/12896* (2015.01); *Y10T 428/12931* (2015.01); *Y10T 428/12937* (2015.01); *Y10T 428/12944* (2015.01); *Y10T 428/12951* (2015.01); *Y10T 428/12972* (2015.01); *Y10T 428/12979* (2015.01); *Y10T 428/12993* (2015.01)

(56) References Cited

U.S. PATENT DOCUMENTS

2006/0216539 A1* 9/2006 Takayanagi et al. .......... 428/642
2010/0248999 A1 9/2010 Izumida et al.

FOREIGN PATENT DOCUMENTS

| JP | 2005-232480 A | 9/2005 |
| JP | 2006-266445 A | 10/2006 |
| JP | 2007-100156 * | 4/2007 |
| JP | 2010-222647 A | 10/2010 |

OTHER PUBLICATIONS

Machine Translation, Ueda et al., JP 2007-100156, Apr. 2007.*
Office Action in corresponding Korean Application 1-2013-7021193, mailed Jul. 22, 2014.
Korean Decision of Refusal for Korean Appln. No. 10-2013-7021193 of Jan. 26, 2015 and English Translation.

* cited by examiner

| ITEM | | CONDITIONS |
|---|---|---|
| CURRENT DENSITY | | 3~7A/dm² |
| PLATING BATH TEMPERATURE | | 35~60°C |
| PLATING LIQUID COMPOSITION | Bi CONCENTRATION | 10~70g/L |
| | Sn CONCENTRATION | 0~15g/L |
| | Cu CONCENTRATION | 0~15g/L |
| | ORGANIC SULFONIC ACID | 30~130g/L |
| | ADDITIVE | 5~70mL/L |
| CONTROL METHOD OF CRYSTAL PLANE | | CONTROL FREQUENCY LEVEL AND OUTPUT LEVEL |

FIG. 4

| SAMPLE No. | INTERMEDIATE LAYER MATERIAL | OVERLAY | | |
|---|---|---|---|---|
| | | MATERIAL | THICKNESS ($\mu$m) | REGION |
| EXAMPLE 1 | - | Bi | 20 | UPPER REGION / LOWER REGION |
| EXAMPLE 2 | Ag alloy | Bi | 5 | UPPER REGION / LOWER REGION |
| EXAMPLE 3 | - | Bi | 5 | UPPER REGION / LOWER REGION |
| EXAMPLE 4 | - | Bi | 25 | UPPER REGION / LOWER REGION |
| EXAMPLE 5 | Ag | Bi | 15 | UPPER REGION / LOWER REGION |
| EXAMPLE 6 | - | Bi | 15 | UPPER REGION / LOWER REGION |
| EXAMPLE 7 | - | Bi | 15 | UPPER REGION / LOWER REGION |
| EXAMPLE 8 | - | Bi | 15 | UPPER REGION / LOWER REGION |
| EXAMPLE 9 | - | Bi | 15 | UPPER REGION / LOWER REGION |
| EXAMPLE 10 | - | Bi | 15 | UPPER REGION / LOWER REGION |
| EXAMPLE 11 | - | Bi2Sn1Cu | 15 | UPPER REGION / LOWER REGION |
| COMPARATIVE EXAMPLE 1 | - | Bi | 5 | UPPER REGION / LOWER REGION |
| COMPARATIVE EXAMPLE 2 | - | Bi | 15 | UPPER REGION / LOWER REGION |
| COMPARATIVE EXAMPLE 3 | - | Bi | 15 | UPPER REGION / LOWER REGION |
| COMPARATIVE EXAMPLE 4 | - | Bi2Sn1Cu | 15 | UPPER REGION / LOWER REGION |

NUMBERS PREFIXED TO ELEMENT SYMBOLS INDICATE MASS%

FIG.5A

| SAMPLE No. | OVERLAY OI OF CRYSTAL PLANES | | | |
|---|---|---|---|---|
| | OI(%) OF (012) PLANE | OI(%) OF (110) PLANE | OI(%) OF (104) PLANE | OI(%) OF (202) PLANE |
| EXAMPLE 1 | 0 | 13 | 12 | 68 |
| | 33 | 15 | 13 | 11 |
| EXAMPLE 2 | 0 | 2 | 18 | 40 |
| | 45 | 0 | 37 | 6 |
| EXAMPLE 3 | 11 | 7 | 5 | 52 |
| | 34 | 7 | 27 | 13 |
| EXAMPLE 4 | 53 | 14 | 13 | 7 |
| | 33 | 10 | 18 | 16 |
| EXAMPLE 5 | 45 | 11 | 15 | 5 |
| | 40 | 13 | 16 | 5 |
| EXAMPLE 6 | 2 | 0 | 98 | 0 |
| | 10 | 2 | 80 | 5 |
| EXAMPLE 7 | 35 | 0 | 2 | 10 |
| | 17 | 0 | 0 | 0 |
| EXAMPLE 8 | 22 | 15 | 9 | 0 |
| | 5 | 59 | 0 | 6 |
| EXAMPLE 9 | 0 | 21 | 18 | 59 |
| | 30 | 14 | 22 | 8 |
| EXAMPLE 10 | 28 | 22 | 9 | 35 |
| | 10 | 14 | 0 | 67 |
| EXAMPLE 11 | 90 | 0 | 3 | 1 |
| | 72 | 2 | 9 | 10 |
| COMPARATIVE EXAMPLE 1 | 8 | 10 | 15 | 55 |
| | 8 | 10 | 15 | 55 |
| COMPARATIVE EXAMPLE 2 | 2 | 4 | 21 | 38 |
| | 2 | 4 | 21 | 38 |
| COMPARATIVE EXAMPLE 3 | 49 | 16 | 11 | 10 |
| | 49 | 16 | 11 | 10 |
| COMPARATIVE EXAMPLE 4 | 88 | 0 | 7 | 4 |
| | 88 | 0 | 7 | 4 |

NUMBERS PREFIXED TO ELEMENT SYMBOLS INDICATE MASS%

FIG.5B

| SAMPLE No. | OVERLAY OI OF CRYSTAL PLANES | | |
|---|---|---|---|
| | OI(%) OF (003) PLANE | OI(%) OF (113) PLANE | OI(%) OF OTHER PLANES |
| EXAMPLE 1 | 2 | 0 | 5 |
| | 14 | 0 | 14 |
| EXAMPLE 2 | 11 | 0 | 29 |
| | 0 | 0 | 12 |
| EXAMPLE 3 | 10 | 8 | 7 |
| | 3 | 0 | 16 |
| EXAMPLE 4 | 3 | 3 | 7 |
| | 3 | 5 | 15 |
| EXAMPLE 5 | 3 | 3 | 18 |
| | 3 | 4 | 19 |
| EXAMPLE 6 | 0 | 0 | 0 |
| | 3 | 0 | 0 |
| EXAMPLE 7 | 40 | 10 | 3 |
| | 83 | 0 | 0 |
| EXAMPLE 8 | 0 | 54 | 0 |
| | 0 | 30 | 0 |
| EXAMPLE 9 | 0 | 0 | 2 |
| | 6 | 0 | 20 |
| EXAMPLE 10 | 0 | 6 | 0 |
| | 5 | 0 | 4 |
| EXAMPLE 11 | 0 | 0 | 6 |
| | 0 | 0 | 7 |
| COMPARATIVE EXAMPLE 1 | 3 | 4 | 5 |
| | 3 | 4 | 5 |
| COMPARATIVE EXAMPLE 2 | 22 | 0 | 13 |
| | 22 | 0 | 13 |
| COMPARATIVE EXAMPLE 3 | 2 | 4 | 8 |
| | 2 | 4 | 8 |
| COMPARATIVE EXAMPLE 4 | 0 | 0 | 1 |
| | 0 | 0 | 1 |

NUMBERS PREFIXED TO ELEMENT SYMBOLS INDICATE MASS%

FIG. 5C

| SAMPLE No. | OVERLAY RATIO OF MAX OI OF REGION b AND MAX OI OF REGION a | BEARING PROPERTIES MAXIMUM SPECIFIC LOAD (MPa) WITHOUT FATIGUING |
|---|---|---|
| EXAMPLE 1 | 16 | 85 |
| EXAMPLE 2 | 15 | 105 |
| EXAMPLE 3 | 25 | 105 |
| EXAMPLE 4 | 62 | 75 |
| EXAMPLE 5 | 89 | 80 |
| EXAMPLE 6 | 82 | 80 |
| EXAMPLE 7 | 208 | 85 |
| EXAMPLE 8 | 56 | 85 |
| EXAMPLE 9 | 14 | 90 |
| EXAMPLE 10 | 191 | 80 |
| EXAMPLE 11 | 80 | 85 |
| COMPARATIVE EXAMPLE 1 | 100 | 75 |
| COMPARATIVE EXAMPLE 2 | 100 | 60 |
| COMPARATIVE EXAMPLE 3 | 100 | 60 |
| COMPARATIVE EXAMPLE 4 | 100 | 75 |

NUMBERS PREFIXED TO ELEMENT SYMBOLS INDICATE MASS%

FIG. 5D

| SAMPLE No. | INTERMEDIATE LAYER MATERIAL | MATERIAL | THICKNESS (μm) | OVERLAY REGION | OI OF CRYSTAL PLANES OI(%) OF (012) PLANE | OI(%) OF (002) PLANE | OI(%) OF (223) PLANE |
|---|---|---|---|---|---|---|---|
| EXAMPLE 12 | — | Ag24Sn | 15 | UPPER REGION | 90 | 2 | 1 |
| | | | | LOWER REGION | 75 | 4 | 5 |
| EXAMPLE 13 | Ni | Ag24Sn | 15 | UPPER REGION | 63 | 12 | 6 |
| | | | | LOWER REGION | 31 | 48 | 2 |
| EXAMPLE 14 | — | Ag20Sn | 5 | UPPER REGION | 92 | 2 | 0 |
| | | | | LOWER REGION | 80 | 10 | 4 |
| EXAMPLE 15 | — | Ag20Sn | 5 | UPPER REGION | 9 | 80 | 2 |
| | | | | LOWER REGION | 31 | 25 | 15 |
| COMPARATIVE EXAMPLE 5 | — | Ag24Sn | 15 | UPPER REGION | 88 | 1 | 1 |
| | | | | LOWER REGION | 88 | 1 | 1 |
| COMPARATIVE EXAMPLE 6 | — | Ag20Sn | 5 | UPPER REGION | 91 | 4 | 1 |
| | | | | LOWER REGION | 91 | 4 | 1 |

FIG. 6A   NUMBERS PREFIXED TO ELEMENT SYMBOLS INDICATE MASS%

| SAMPLE NO. | OVERLAY | | | | BEARING PROPERTIES |
|---|---|---|---|---|---|
| | OI OF CRYSTAL PLANES | | | RATIO OF MAX OI OF REGION b AND MAX OI OF REGION a | MAXIMUM SPECIFIC LOAD (MPa) WITHOUT FATIGUING |
| | OI (%) OF (014) PLANE | OI (%) OF (022) PLANE | OI (%) OF OTHER PLANES | | |
| EXAMPLE 12 | 3 | 0 | 4 | 83 | 130 |
| | 9 | 0 | 7 | | |
| EXAMPLE 13 | 4 | 7 | 8 | 49 | 135 |
| | 6 | 3 | 10 | | |
| EXAMPLE 14 | 2 | 0 | 4 | 87 | 150 |
| | 2 | 0 | 4 | | |
| EXAMPLE 15 | 3 | 4 | 2 | 39 | 155 |
| | 5 | 9 | 15 | | |
| COMPARATIVE EXAMPLE 5 | 5 | 0 | 5 | 100 | 115 |
| | 5 | 0 | 5 | | |
| COMPARATIVE EXAMPLE 6 | 0 | 0 | 4 | 100 | 125 |
| | 0 | 0 | 4 | | |

FIG. 6B   NUMBERS PREFIXED TO ELEMENT SYMBOLS INDICATE MASS%

| | |
|---|---|
| BEARING INNER DIAMETER | φ48mm |
| BEARING WIDTH | 20mm |
| VELOCITY | 20m/s |
| SHAFT MATERIAL | S55C |
| TEST LOAD | INCREMENT BY 5MPa EVERY 10 MINUTES |
| METHOD OF EVALUATION | SEIZURE LOAD IS DETERMINED WHEN:<br>·TEMPERATURE OF BEARING BACK EXCEEDS 200°C<br>OR<br>·SHAFT DRIVING BELT SLIPS BY TORQUE CHANGE |
| OTHERS | TEST IS STARTED AFTER TEST BEARING HAVING 0.7mg OF IRON-BASED PARTICLES EMBEDDED INTO BEARING SURFACE IS INSTALLED IN TEST HOUSING |

FIG. 7

| | |
|---|---|
| BEARING INNER DIAMETER | φ48mm |
| BEARING WIDTH | 20mm |
| VELOCITY | 20m/s |
| SHAFT MATERIAL | S55C |
| TEST LOAD | INCREMENT BY 5MPa EVERY 10 MINUTES |
| METHOD OF EVALUATION | SEIZURE LOAD IS DETERMINED WHEN:<br>·TEMPERATURE OF BEARING BACK EXCEEDS 200°C<br>OR<br>·SHAFT DRIVING BELT SLIPS BY TORQUE CHANGE |
| OTHERS | TEST IS STARTED AFTER TEST BEARING HAVING SIM OF 2mm WIDTH AND 5μm THICKNESS ATTACHED ON BOTH AXIAL ENDS OF BEARING BACK IS INSTALLED IN TEST HOUSING |

FIG. 8

| BEARING INNER DIAMETER | φ62mm |
| --- | --- |
| BEARING WIDTH | 26mm |
| ROTATION COUNT | 3200rpm |
| SHAFT MATERIAL | S55C |
| TEST TIME | 5hours |
| METHOD OF EVALUATION | MAXIMUM SPECIFIC LOAD WITHOUT CRACKING |

FIG. 9

SLIDING MEMBER

TECHNICAL FIELD

The present invention relates to a slide member provided with an overlay over a base material.

BACKGROUND

A slide member such as a slide bearing used in internal combustion engines of automobiles has an overlay provided, for example, over a bearing alloy layer being backed by metal, in order to improve bearing properties such as fatigue resistance and seizure resistance.

Overlay has been conventionally made of soft Pb alloy. However, because Pb is environmentally burdensome, metal such as Bi or Bi alloy is being proposed as an alternative to Pb. Overlay comprising Bi may not be as fatigue resistant as an overlay comprising Pb because of the brittle nature of Bi. This is addressed, for example, in JP 2006-266445 A by growing the crystal grains of Bi or Bi alloy forming the overlay into a columnar shape. The load applied by the counter element such as a crank shaft is received in the direction of the longer side of the columnar crystal grains to thereby improve the fatigue resistance of the overlay.

SUMMARY OF THE INVENTION

Problems to be Overcome

Attempts to further improve the performance of internal combustion engines subjects slide members, typically assembled into connecting rods, to increasingly severe operating environment. Thus, the slide member needs to improve its performance for suitability with such application.

One of such performance improvement includes further improvement of fatigue resistance of the overlay. Improvement in fatigue resistance of the overlay and consequently the slide member is being achieved through thinning of the overlay. However, simply thinning the overlay has given rise to degradation in embeddability and conformability of the overlay.

It is thus, one object of the present invention to provide a slide member having outstanding fatigue resistance without degrading embeddability and conformability.

Means to Overcome Problem

The inventors have undergone numerous experiments focusing on Miller indices of the material forming the overlay, as well as on the shape of the material forming the overlay when viewed in the thickness direction of the overlay. As a result, the inventors have found that the fatigue resistance of the overlay, and consequently the slide member, can be improved without thinning the overlay by forming the overlay so that orientation index (OI) of a crystal plane represented in Miller indices differs in the thickness direction of the overlay. This is believed to be attributable to a thin film effect of the overlay.

A slide member according to one embodiment of the present invention comprises a base material and an overlay provided over the base material. The overlay has a plurality of regions in the thickness direction including a sliding-surface side region that slides with the counter element and a base-material side region. The material forming the overlay includes a plurality of crystal planes. The orientation index of at least one of the crystal planes differs in the sliding-surface side region and the base-material side region of the overlay.

The slide member according to one embodiment of the present invention exerts outstanding fatigue resistance without degrading embeddability and conformability through the above described structure.

In the present invention, a crystal plane is identified by Miller index. Miller index is indicated as (h, k, l), in which h, k, l are integers. Orientation index can be expressed as:

$$\text{Orientation Index}(\%) = \{R_{(h,k,l)} \div \Sigma R_{(h,k,l)}\} \times 100(\%)$$

when the X-ray diffraction intensity of the crystal plane is indicated as $R_{(h, k, l)}$.

In the above equation, numerator $R_{(h, k, l)}$ represents the X-ray diffraction intensity of a given plane for which orientation index is to be obtained, whereas denominator $\Sigma R_{(h, k, l)}$ represents the total sum of the X-ray diffraction intensity of each of the planes.

The base material is a structure for providing the overlay. For example, in a structure in which a metal back, a bearing alloy layer, an intermediate layer serving as a bonding layer, and an overlay are stacked in the listed sequence, the metal back, the bearing alloy layer, and the intermediate layer constitute the base material. In a structure in which a metal back, a bearing alloy layer, and an overlay are stacked in the listed sequence, the metal back and the bearing alloy layer constitute the base material. Further, in a structure in which overlay is provided over the metal back, the metal back constitute the base material.

When providing a bearing alloy layer, the bearing alloy layer is to comprise Al, Al alloy, Cu, Cu alloy or other materials.

When providing an intermediate layer, the intermediate layer preferably comprises one or more types of materials selected from the group of Ag, Ag alloy, Ni, Ni alloy, Co, and Co alloy. This is in view of improving the bonding force of the overlay and improving the stability of surface roughness of the overlay.

The overlay is made of a single material composition throughout. The material forming the overlay includes a plurality of crystal planes. The material is preferably Bi, Bi-based material, or Ag-based material. The material may also be either of Sn, Sn alloy, Ag, Ni and Ni alloy. Especially when forming the overlay with Bi, Bi alloy or Ag alloy, the above described effects can be achieved much easier from a manufacturing point of view. Bi alloy is preferably BiCu alloy, BiSn alloy, or BiSnCu alloy.

The overlay may include additives of hard particles comprising silicon nitride, or the like or solid lubricants such as molybdenum disulfide, or the like.

The thicknesswise dimension, in other words, the thickness of the overlay is preferably 30 µm or less in order to more stably exert outstanding fatigue resistance. Further, the thickness of the overlay is preferably 5 µm or more in order to improve bearing properties such as embeddability and conformability of the overlay. The thickness of the overlay more preferably ranges from 7 to 22 µm.

The overlay comprises a plurality of regions in the thickness direction. Among the crystal planes of the material that form the overlay, the orientation index of at least one crystal plane differs in a region located in the sliding surface side and in a region located in the base-material side of the overlay.

The above described region is defined as a continuous portion in which the orientation index of each of the crystal planes of the material that constitutes the overlay are identical when measured at micro points that are spaced apart. In other words, a region is a predetermined range in which the ratio of X-ray diffraction intensities (hereinafter also referred to as an orientation pattern) of all the crystal planes is identical.

A region may be layer component having a predetermined width. The regions forming the overlay are stacked in the thickness direction of the overlay. In case the regions having the same orientation pattern are located apart from one another, these regions are considered to be different regions.

The sliding-surface side region of the overlay is one of the plurality of regions which is located in the sliding-surface side of the overlay compared to the base-material side region of the overlay.

The sliding-surface side region of the overlay is preferably located in the most sliding-surface side in view of controllability of the overlay. The base-material side region of the overlay is one of the plurality of regions which is located in the base-material side of the overlay compared to the sliding-surface side region of the overlay. The base-material side region of the overlay is preferably located in the most base-material side in view of controllability of the overlay.

For example, in case the overlay is made of 2 regions, the region encompassing the sliding surface is the sliding-surface side region of the overlay and the remaining region contacting the base material is the base-material side region of the overlay.

Further, in case the overlay is made of 3 or more regions, the region encompassing the sliding surface is the sliding-surface side region of the overlay region contacting the base material is the base-material side region of the overlay.

The plurality of regions forming the overlay will be described with reference to FIG. 2. FIG. 2 schematically exemplifies the distribution of the regions that form the overlay. More specifically FIG. 2 indicates the relation between a thicknesswise location within the overlay and an orientation index of a given crystal plane of the material forming the overlay at such location.

FIG. 2a illustrates an example in which the overlay is made of two regions. When a focus is placed on a certain crystal plane, it can be seen from FIG. 2a that the orientation index of that crystal plane varies at the thicknesswise mid portion of the overlay.

FIG. 2b illustrates an example in which the overlay is made of three or more regions, more specifically, five regions. When a focus is placed on a certain crystal plane, it can be seen from FIG. 2b that the orientation index of that crystal plane varies in a stepped manner, more specifically, in five steps in the thicknesswise direction of the overlay.

FIG. 2c illustrates an example in which the overlay is deemed to be made of a plurality of regions. When a focus is placed on a certain crystal plane, it can be seen from FIG. 2c that the variation of orientation index of that crystal plane in the thicknesswise direction of the overlay draws a curved line.

FIG. 2d also illustrates an example in which the overlay is deemed to be made of a plurality of regions. When a focus is placed on a certain crystal plane, it can be seen from FIG. 2d that the variation of orientation index of that crystal plane in the thicknesswise direction of the overlay draws a waveform.

The above described distributions of regions that form the overlay are merely examples. In case the orientation index of a crystal plane of a material that form the overlay varies in the thicknesswise direction, the overlay is deemed to be made of a plurality of regions.

In the above described structure, the overlay is formed by a plurality of regions in which orientation index, in other words, the orientation pattern of at least one crystal plane among all the crystal planes that constitute the material of the overlay varies. According to such structure, the overlay achieves the operation and effect similar to a laminate of thin layers each being made of identical composition, and thereby improves the fatigue resistance of the slide member. Stated differently, each of the regions that form the overlay serves as thin layer of identical composition, thereby believed to provide effects of a thinned overlay.

Further, good embeddability and conformability are achieved since the overlay is sufficiently thick throughout. Still further, physical properties such as hardness and melting point do not substantially vary since the overlay is made of a single material throughout.

Even when the overlay is made of Bi alloy or Ag alloy instead of Bi, effects similar to those of an overlay made of Bi can be obtained. Further, effects similar to those of an overlay made of Bi can be obtained even when the overlay is made of either of Sn, Sn alloy, Ag, Ni and Ni alloy Bi alloy instead of Bi.

In the above described overlay, the crystal plane having the highest orientation index in the sliding-surface side region is identified as "crystal plane Z". The orientation index of crystal plane Z in the sliding-surface side region is identified as "P". The orientation index of crystal plane Z in the base-material side region is identified as "Q". In such case, $Q \div P \times 100(\%) \leq 50(\%)$, or $Q \div P \times 100(\%) \geq 200(\%)$ is preferably true.

In the above equations, "$Q \div P \times 100$" obtains "variation percentage" which indicates the magnitude of variation of orientation index for crystal plane Z in the thickness direction of the overlay. In case the variation percentage is 100%, it is an indication that the orientation index of crystal plane Z does not vary in the thickness direction of the overlay, that is, in the sliding-surface side region and the base-material side region. As the variation percentage becomes farther from 100%, it is an indication that the orientation index of crystal plane Z varies in the sliding-surface side region and the base-material side region.

By controlling the variation percentage to 50% or less or 200% or greater, the orientation index of crystal plane Z can be significantly varied in the sliding-surface side region and the base-material side region. Thus, the fatigue resistance of the slide member can be improved even more effectively. This is believed to be attributable to the effect similar to a thinned overlay being achieved more efficiently.

Further, the crystal plane having the highest orientation index in the sliding-surface side of the overlay is preferably different from the crystal plane having the highest orientation index in the base-material side of the overlay.

It becomes easier to significantly vary the orientation pattern in the sliding-surface side and the base-material side when the crystal plane having the highest orientation index in the sliding-surface side is different from the crystal plane having the highest orientation index in the base-material side, which in turn improves the fatigue resistance of the slide member more effectively. This is believed to be attributable to the effect similar to a thinned overlay being achieved more efficiently.

When Bi is used as a material of the overlay, fatigue resistance of slide member can be improved even more effectively when the crystal plane having the highest orientation index in the sliding-surface side is either of (003) plane, (012) plane, (104) plane, (202) plane, and (113) plane represented by Miller index.

One of the methodologies for forming a plurality of regions having different orientation indices in the thickness direction of the overlay is multi-layer plating. More specifically, two or more plating baths including different types and amounts of additives are prepared. Additives are believed to influence the level of orientation index. Plating is carried out in the baths in sequence to obtain a plurality of regions in the thickness direction of the overlay.

A plurality of regions in the thickness direction of the overlay can also be obtained by varying current density, bath temperature, the level of stir, or the like while the overlay is being plated.

The inventors further found that plurality of regions in the thickness direction of the overlay can be obtained by applying ultrasonic waves having plurality types of frequency levels to the plating liquid used for forming the overlay. More specifically, the inventors have found that among the crystal planes of the material, (h, 0, 0) plane is preferentially oriented as the frequency applied to the plating bath for forming the overlay becomes higher within the frequency range of 28 kHz to 170 kHz, and that among the crystal planes of the material, (h,k,0) plane is preferentially oriented as the frequency applied to the plating bath becomes lower within the frequency range of 28 kHz to 170 kHz.

Thus, the orientation index of a crystal plane in the thickness direction can be varied to a given level by selecting two or more types of frequencies within the frequency range of 28 kHz to 170 kHz and oscillating ultrasonic waves of such frequencies while controlling their output such as size and duration.

Employing the ultrasonic waves of the above described frequencies facilitates the formation of the overlay since multiple baths need not be used for forming the overlay. Employing the ultrasonic waves of the above frequencies further produces an overlay which is more uniform in surface roughness of the sliding surface and appearance as compared to the approach in which current density, plating bath temperature, level of stir, or the like are varied while plating the overlay.

The range of frequencies and output of frequencies applied to the plating liquid varies depending upon plating conditions.

Further, the methodologies for varying the orientation index in the thickness direction of the overlay are not limited to those described above.

BRIEF DESCRIPTION OF THE DRAWINGS

FIG. 4 shows a table indicating one example of conditions applied in Bi plating.

FIGS. 5a to 5d show a table indicating the test results of EXAMPLES and COMPARATIVE EXAMPLES provided with an overlay made of Bi or Bi alloy.

FIGS. 6a to 6b show a table indicating the test results of EXAMPLES and COMPARATIVE EXAMPLES provided with an overlay made of Ag alloy.

FIG. 7 shows a table indicating one example of conditions applied in a test for verifying embeddability.

FIG. 8 shows a table indicating one example of conditions applied in a test for verifying conformability.

FIG. 9 shows a table indicating one example of conditions applied in a fatigue test.

EMBODIMENTS OF THE INVENTION

Figure 1:
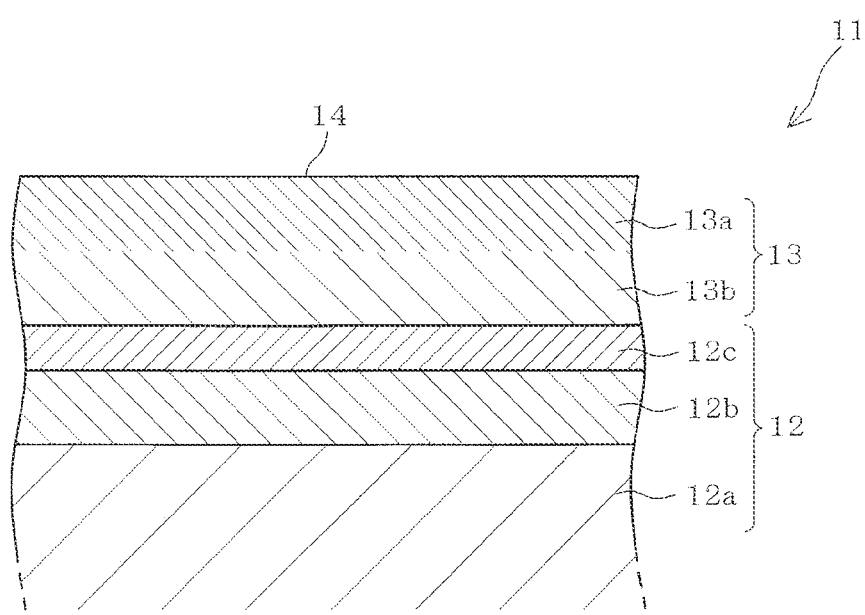
FIG. 1 shows a cross sectional view schematically indicating a slide member of one embodiment of the present invention.

FIG. 1 is a cross sectional view of a slide member of one embodiment. Slide member 11 illustrated in FIG. 1 is a slide bearing used, for example, in internal combustion engines of automobiles. Slide member 11 includes base material 12 and overlay 13 provided over base material 12. Base material 12 includes metal back 12a, an Al based or Cu based bearing alloy layer 12b, and intermediate layer 12c provided overbearing alloy layer 12b. Overlay 13 is formed of Bi based or Ag based materials.

The surface of overlay 13 located on the opposite side of base material 12 serves as sliding surface 14. Counter elements such as a crank shaft not shown are disposed in sliding surface 14 side of overlay 13.

Among the crystal planes identified by Miller indices of Bi that form overlay 13, the orientation index of at least one crystal plane differs in the two regions 13a and 13b. Regions 13a and 13b are formed as layers having substantially even width in the thickness direction and extend entirely across base material 12 so as to be laminated in the thickness direction of overlay 13. In FIG. 1, region 13a is located in sliding-surface side of overlay 13, whereas region 13b is located in base-material 12 side of overlay 13.

FIG. 3 exemplifies crystal planes and X-ray diffraction intensities in a sample structured like overlay 13 described above. The crystal planes and X-ray diffraction intensities were measured using X-ray diffraction equipment (RINT2200V) made by Rigaku Corporation. The sample was manufactured by processes similar to those employed in the later described EMBODIMENTS. The thickness of overlay 13 of the sample was 5 μm.

Region 13a in sliding surface 14 side of overlay 13 was measured in sliding surface 14 of overlay 13. The crystal planes in region 13a include (003) plane, (101) plane, (104) plane, (110) plane, (006) plane, (202) plane, (107) plane, (205) plane, (214) plane, (009) plane, and (300) plane identified by Miller indices as shown in FIG. 3a.

Crystal planes of region 13b in base material 12 side of overlay 13 was measured in a location of overlay 13 distanced by 0.5 μm toward sliding surface 14 side from the most sliding surface 14 side portion of base material 12 within the measurement field. The crystal planes in region 13b include (003) plane, (101) plane, (012) plane, (104) plane, (110) plane, (006) plane, (202) plane, (107) plane, (214) plane, and (009) plane, identified by Miller indices as shown in FIG. 3b.

Figure 3A:
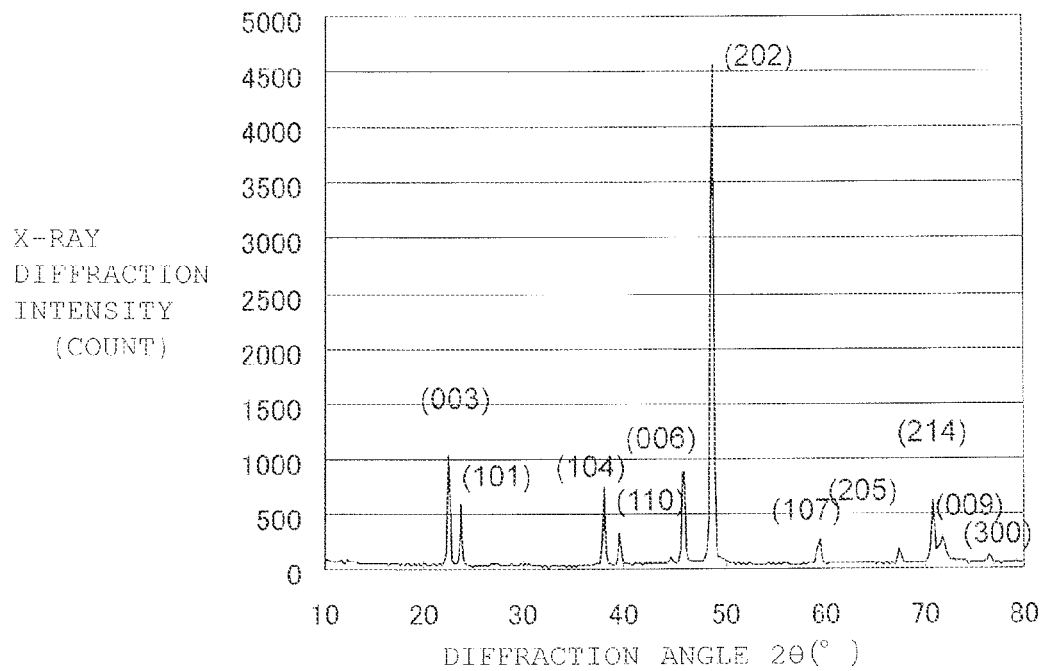
FIG. 3a shows a chart indicating the crystal planes in the sliding-surface side region of the overlay and their X-ray diffraction intensities.
Figure 3B:
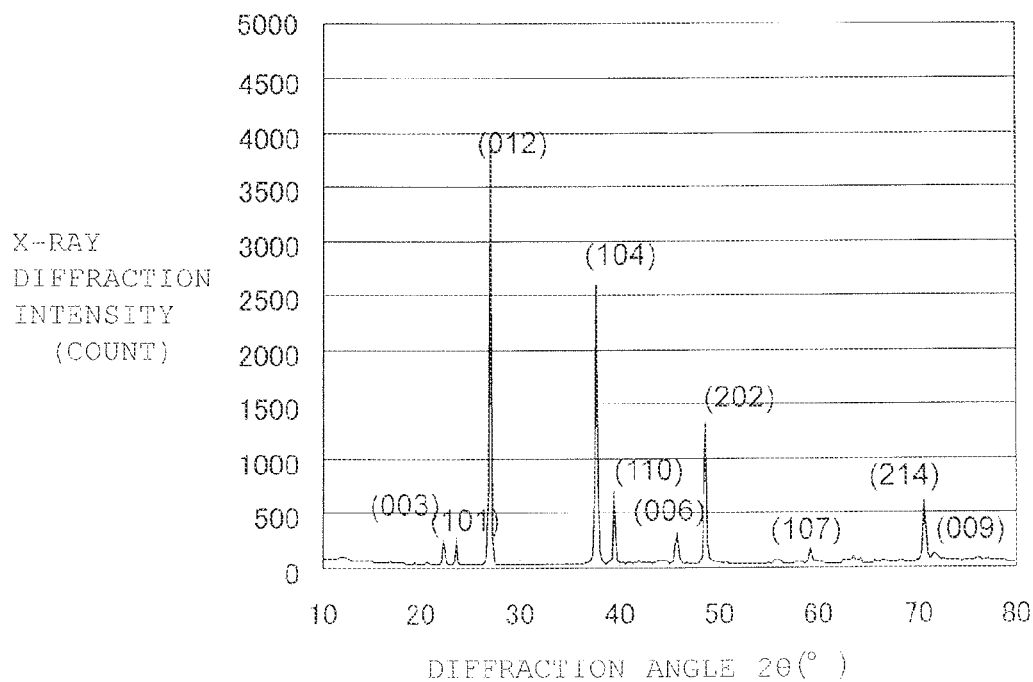
FIG. 3b shows a chart indicating the crystal planes in the base-material side region of the overlay and their X-ray diffraction intensities.

As indicated in FIG. 3a, the crystal plane having the highest orientation index in region 13a located in sliding surface 14 side was crystal plane (202) identified by Miller indices. This crystal plane is referred to as "crystal plane Z". Orientation index P of crystal plane Z in region 13a of sliding surface 14 side was 52%. Orientation index Q of a crystal plane corresponding to crystal plane Z in region 13b of base material 12 side was 13%. Thus, variation percentage was:

$$Q \div P \times 100\% = 13 \div 52 \times 100\% \approx 25\% < 50\%$$

As mentioned earlier, the crystal plane having the highest orientation index in region 13a located in sliding surface 14 side of overlay 13 was crystal plane (202) identified by Miller indices. The crystal plane having the highest orientation index in region 13b located in base material 12 side was crystal plane (012) identified by Miller indices. Thus, the crystal plane having the highest orientation index differs in the thickness direction, in other words, in region 13a in sliding surface 14 side and in region 13b in the base-material 12 side.

The above described sample exhibited superior fatigue resistance and the same level of embeddability and conformability as compared to a sample in which overlay 13 is similar in thickness but does not have different orientation pattern in the thickness direction. Further, the above described sample exhibited superior fatigue resistance as compared to a sample in which variation percentage of overlay 13 is greater than 50% and lower than 200% and in which the crystal plane having the highest orientation index in region 13a in sliding-surface 14 side and the crystal plane having the highest orientation index in region 13b in the base-material 12 side are identical.

Next, a description will be given on tests carried out for verifying the advantages of slide member 11 of the present embodiment.

EXAMPLES 1 to 11 similar in structure to slide member 11 of the present embodiment were prepared as follows.

First, a Cu-based bearing alloy layer was provided over a steel back to obtain a bimetal. The bimetal was molded into a semi-cylindrical or cylindrical form. The surface of the bearing alloy layer of the semi-cylindrical or cylindrical bimetal was surface finished by boring. The surface finished semi-cylindrical or cylindrical mold was subjected to field degreasing and was surface cleaned with acid.

Then, as required, intermediate layer was provided over the bearing alloy layer of the mold. Next, a plating process indicated in FIG. 4 was performed to form overlay 13 over the bearing alloy layer or the intermediate layer of the mold. In order to vary the orientation index of the crystal plane in the thickness direction of overlay 13, plating process was carried out by irradiating ultrasonic waves to the plating liquid. The ultrasonic waves were controlled to two types of frequencies, namely, a high frequency and a low frequency within the frequency range of 28 kHz to 170 kHz. The output of the irradiated ultrasonic waves was controlled within the range of 300 W to 600 W. The output of the ultrasonic waves controlled to the above described frequencies were varied within the above described frequency range during the plating process.

The above described manufacturing method produced EXAMPLES 1 to 11 and 12 to 15 of slide member 11 which are provided with overlay 13 formed of two regions in which orientation pattern differ in the thickness direction of overlay 13. EXAMPLES 1 to 11 are provided with overlay 13 made of Bi or Bi alloy. EXAMPLES 12 to 15 are provided with overlay 13 made of Ag alloy. The properties of EXAMPLES 1 to 11 are indicated in FIGS. 5A to 5D and properties of EXAMPLES 12 to 15 are indicated in FIGS. 6A and 6B.

COMPARATIVE EXAMPLES 1 to 4 or COMPARATIVE EXAMPLES 5 and 6 were obtained by processes similar to those for obtaining EXAMPLES 1 to 15 except that the output of ultrasonic waves applied to the plating liquid was not varied. The orientation pattern of overlay 13 of COMPARATIVE EXAMPLES 1 to 6 thus, obtained was not varied in the thickness direction of overlay 13. The properties of COMPARATIVE EXAMPLES 1 to 6 are indicated in FIGS. 5A to 5D and 6A and 6B.

Tests for verifying embeddability and conformability were conducted for EXAMPLE 3 and COMPARATIVE EXAMPLE 1 which exhibit similar properties except for orientation pattern. The test conditions applied in verifying embeddability are indicated in FIG. 7. The test conditions applied in verifying conformability are indicated in FIG. 8. The test results show that EXAMPLE 3 and COMPARATIVE EXAMPLE 1 both exhibited embeddability of 55 MPa and conformability of 60 MPa. Similarly, comparison of EXAMPLE 9 and COMPARATIVE EXAMPLE 2 shows that EXAMPLE 9 and COMPARATIVE EXAMPLE 2 both exhibited embeddability of 85 MPa and conformability of 80 MPa. Further, comparison of EXAMPLE 12 and COMPARATIVE EXAMPLE 5 shows that EXAMPLE 12 and COMPARATIVE EXAMPLE 5 both exhibited embeddability of 40 MPa and conformability of 45 MPa.

Samples of EXAMPLES 1 to 15 and COMPARATIVE EXAMPLES 1 to 6 were put through fatigue test under the conditions indicated in FIG. 9. The test results are shown in FIGS. 5 and 6. In the fatigue test, the specific load immediately preceding the specific load in which crack was observed, in other words, the maximum specific load in which a crack was not observed is defined as the "maximum specific load without fatiguing".

In FIGS. 5A to 5D and 6A and 6B, "thickness" indicates the average thickness of the entire overlay 13. The "thickness" was measured by visual observation based on a cross sectional photograph of overlay 13.

In FIGS. 5A to 5D and 6A and 6B, sliding-surface side region 13a of overlay 13 is represented as "upper region", whereas base-material 12 side region 13b of overlay 13 is represented as "lower region". In this test, the output of ultrasonic waves was varied halfway through the duration of plating so that the thickness of "upper region" and "lower region" become substantially equal. The crystal planes in the upper region and the lower region of overlay 13, as well as the X-ray diffraction intensities of the crystal planes were measured using X-ray diffraction equipment (RINT2200V) made by Rigaku Corporation.

Crystal planes and X-ray diffraction intensity of the upper region were measured in sliding surface 14 of overlay 13. Crystal planes and X-ray diffraction intensity of the lower region 13b were measured in a location of overlay 13 distanced by a predetermined length toward sliding surface 14 side from the most sliding surface 14 side portion of base material 12 within the measurement field. More specifically, crystal planes of the lower region and X-ray diffraction intensity were measured as follows. Using electrolytic polishing, overlay 13 was removed toward base material 12 side from sliding surface 14 side of overlay 13 so that 0.5 μm of overlay 13 remains over base material 12 when measured in the thickness direction from base material 12. The orientation indices of the crystal planes of the upper and lower regions were calculated from X-ray diffraction intensities.

In FIGS. 5A to 5D and 6A and 6B, "variation percentage" was obtained as follows. The crystal plane having the highest orientation index in the upper region is identified as crystal plane Z. The orientation index of crystal plane Z in the upper region is identified as "P". The orientation index of crystal plane Z in the lower region is identified as "Q". In such case, variation percentage is given by Q÷P×100.

Analysis of the fatigue test is given hereinafter.

In EXAMPLES 1 to 15 overlay 13 comprises a plurality of regions located in the thickness direction and the orientation index of at least one of the crystal planes differs in the upper region and the lower region. As clearly evidence by the comparison of EXAMPLE 10 and COMPARATIVE EXAMPLE 2 which are identical in thickness, EXAMPLES 1 to 15 are superior in fatigue resistance as compared to COMPARATIVE EXAMPLES 1 to 6.

Comparison of EXAMPLE 8 and EXAMPLE 9 shows that EXAMPLE 9 in which the variation percentage is 50% or less is further superior in fatigue resistance as compared to EXAMPLE 8 in which variation percentage is greater than 50%.

Comparison of EXAMPLE 7 and EXAMPLE 10 show that EXAMPLE 7 in which the variation percentage is equal to or greater than 200% is further superior in fatigue resistance as compared to EXAMPLE 10 in which variation percentage is less than 200%.

Comparison of EXAMPLE 6 and EXAMPLE 8 show that EXAMPLE 8 in which the crystal plane having the highest orientation index in the upper region differs from the crystal plane having the highest orientation index in the lower region is further superior in fatigue resistance as compared to EXAMPLE 6 since the crystal plane having the highest orientation index in the upper region differs from the crystal plane having the highest orientation index in the lower region.

Though not shown, when only the composition of the overlay was varied, meaning that when Bi constituting the overlay 13 of EXAMPLES was replaced by either of Bi alloy, Sn, Sn alloy, Ag, Ni, and Ni alloy, results similar to the EXAMPLES in which overlay 13 was made of Bi was obtained.

The composition of intermediate layer 12c may be modified. For example, Ag or Ag alloy constituting intermediate layer 12c may be modified by one or more types of components selected from the group of Ni, Ni alloy, Co, and Co alloy. For example, in EXAMPLE 2 in which intermediate layer 12c is made of Ag alloy, similar fatigue resistance was obtained when a laminate of Ag layer and Ni layer was employed.

It was further verified that outstanding fatigue resistance was obtained in EXAMPLES in which the crystal plane having the highest orientation index in sliding-surface 14 side of overlay 13 was either of (003) plane, (012) plane, (104) plane, (202) plane, and (113) plane.

Figure 2A:
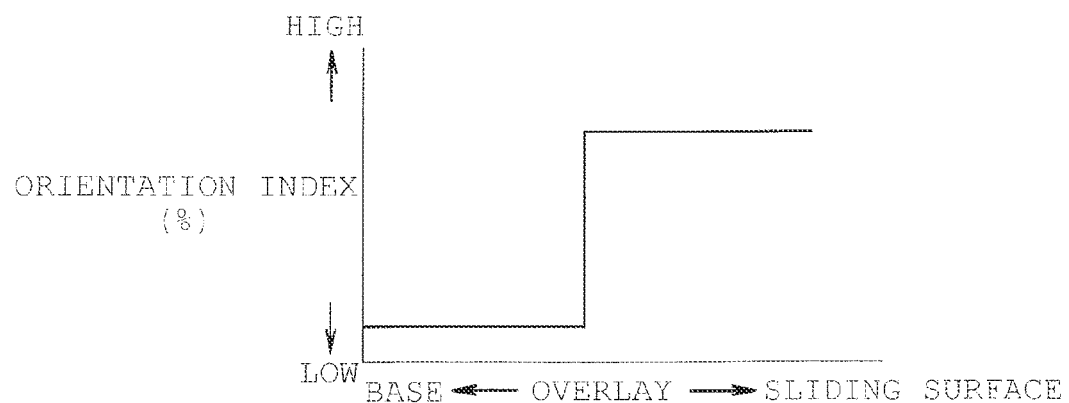
FIG. 2a shows a chart briefly indicating the distribution of regions that form the overlay.
Figure 2B:
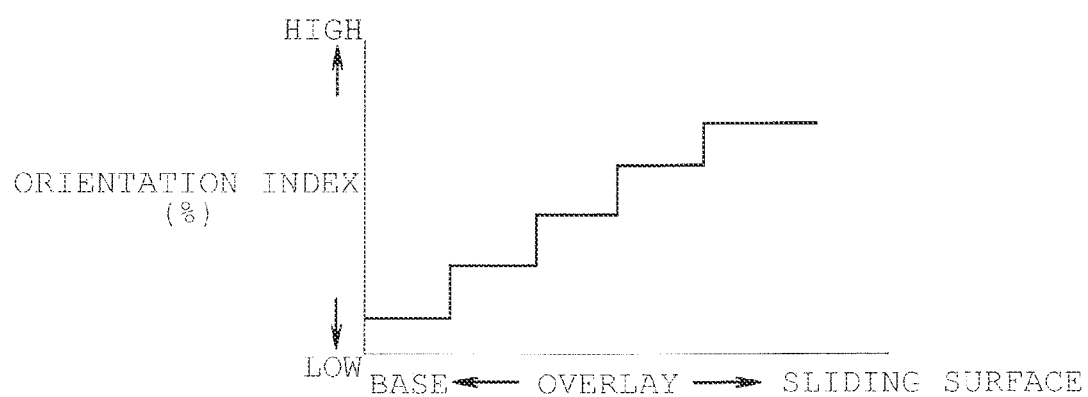
FIG. 2b shows a chart briefly indicating the distribution of regions that form the overlay.
Figure 2C:
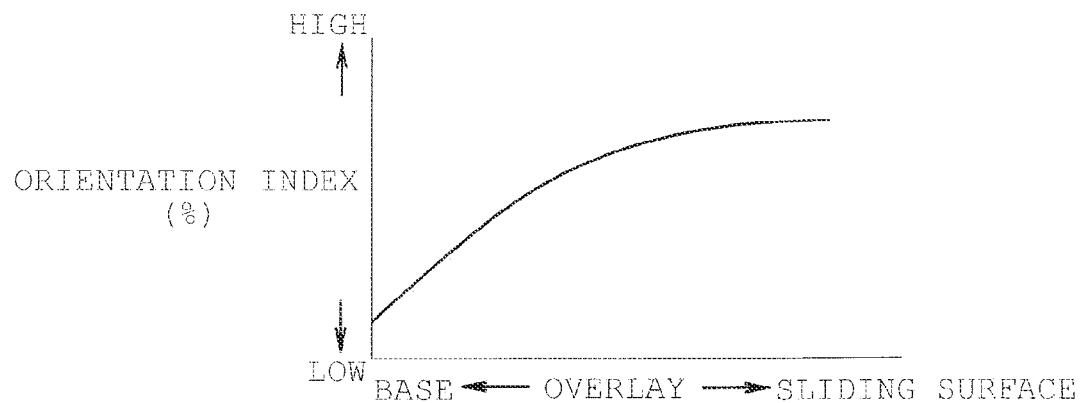
FIG. 2c shows a chart briefly indicating the distribution of regions that form the overlay.
Figure 2D:
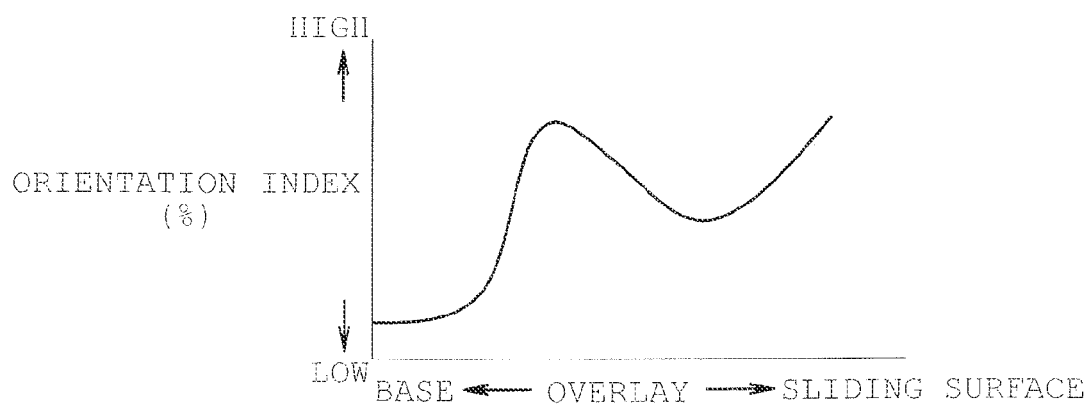
FIG. 2d shows a chart briefly indicating the distribution of regions that form the overlay.

Further, EXAMPLES provided with overlay 13 indicated in FIG. 2b to 2d exhibited the same or improved level of fatigue resistance as compared to EXAMPLES provided with overlay 13 formed of two regions.

The present embodiment may be modified within the scope of the spirit of the invention.

The only requirement in the relative location of region 13a in sliding-surface 14 side and region 13b in base-material 12 side is that region 13a in sliding-surface 14 side is relatively closer to sliding surface 14 side as compared to region 13b in base-material 12 side.

As long as the orientation index of at least one of the crystal planes in overlay 13 differs in region 13a of sliding-surface 14 side and region 13b of base-material 12 side, orientation patterns of other regions intervening these two regions may be configured to any levels.

The location of measurement of region 13a in sliding-surface 14 side and region 13b in base-material 12 side is merely an example. Thus, the location of measurement may be modified within the predetermined region.

Though not described, each of the components includes unavoidable impurities.

What is claimed is:

1. A slide member comprising:
a base material; and
an overlay provided over the base material,
wherein the overlay includes a plurality of regions in a thickness direction including a sliding-surface side region that slides with the counter element and a base-material side region,
wherein a material forming the overlay includes a plurality of crystal planes and orientation index of at least one of the crystal planes differs in the sliding-surface side region and the base-material side region of the overlay, and wherein $Q \div P \times 100(\%) \leq 50(\%)$ or $Q \div P \times 100(\%) \geq 200(\%)$ where:
crystal plane Z represents a crystal plane having the highest orientation index within the sliding-surface side region of the overlay,
P represents orientation index of the crystal plane Z in the sliding-surface side region of the overlay,
Q represents orientation index of a crystal plane within the base material side region corresponding to the crystal plane Z, and
wherein the overlay comprises a Bi-based material or an Ag-based material.

2. The slide member according to claim 1, wherein the base material comprises a bearing alloy layer and an intermediate layer provided between the bearing alloy layer and the overlay, and
wherein the intermediate layer comprises one or more types of materials selected from the group of Ag, Ag alloy, Ni, Ni alloy, Co, and Co alloy.

3. The slide member according to claim 1, wherein the crystal plane having the highest orientation index in the sliding-surface side of the overlay is different from the crystal plane having the highest orientation index in the base-material side of the overlay.

4. The slide member according to claim 3, wherein the base material comprises a bearing alloy layer and an intermediate layer provided between the bearing alloy layer and the overlay, and
wherein the intermediate layer comprises one or more types of materials selected from the group of Ag, Ag alloy, Ni, Ni alloy, Co, and Co alloy.

* * * * *